United States Patent Office 3,395,443
Patented Aug. 6, 1968

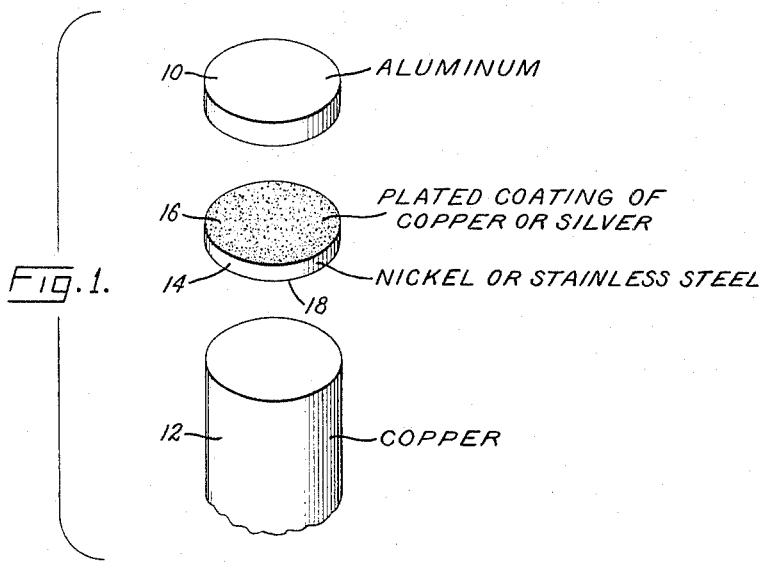
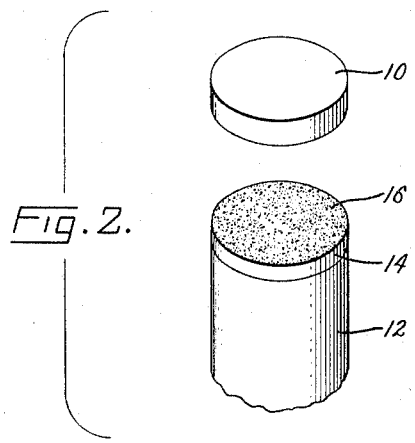

3,395,443
METHOD OF FORMING A HIGH TEMPERATURE-RESISTANT BOND BETWEEN ALUMINUM AND A DISSIMILAR METAL
George Polinko, Jr., West Chester, Pa., assignor to General Electric Company, a corporation of New York
Filed Sept. 29, 1965, Ser. No. 491,236
7 Claims. (Cl. 29—471.7)

ABSTRACT OF THE DISCLOSURE

A method of bonding an aluminum part to another part of dissimilar metal, comprising: (1) providing an insert of a metal immiscible with aluminum at temperatures up to 615° C., (2) plating a surface of the insert with copper or silver, (3) joining the insert to the part of dissimilar metal with the plated coating exposed, (4) positioning the aluminum part in contact with the plated coating, and (5) then raising the surrounding temperature to about 615° C. to cause diffusion of the metal of the plated coating into the aluminum, thus effecting a bond between the insert and the aluminum part upon subsequent cooling.

---

This invention relates to a method of bonding an aluminum part to another part of a dissimilar metal that is miscible with aluminum at temperatures of about 600° C. or lower. The invention is particularly concerned with a method of providing a joint of this type that can withstand without damage temperatures as high as 400° C.

Efforts have heretofore been made to bond an aluminum part directly to a part made of a metal that is miscible in aluminum at the bonding temperature, e.g., bonding the aluminum part directly to a copper part at temperatures of around 600° C. The results of such efforts have not been satisfactory because the copper dissolves in the aluminum and seriously deforms the aluminum part.

It has also been proposed to place an insert between the two parts, which insert is made of a metal, such as nickel, that can be more readily joined to each of the two parts. But even with this insert present, there are still certain difficulties in bonding the aluminum part to the insert. For example, it has been proposed to braze the aluminum part to the insert with an aluminum-silicon brazing alloy. This alloy requires a brazing temperature of about 640° C. This temperature is so close to the 660° C. melting point of aluminum that there is a possibility of inadvertently melting the aluminum during brazing. Such melting would be most undesirable for various reasons, one of which is the resulting deformation of the aluminum part.

Brazing or soldering alloys having lower brazing temperatures have been considered, but the joints resulting from such alloys have generally not been able to safely withstand the 400° C. temperatures referred to hereinabove, which the joints are required to withstand.

Other joining techniques requiring high temperatures and pressures have been proposed, but these have been generally unsuitable because of the danger of deforming the aluminum part.

An object of my invention is to provide a method of bonding the aluminum part to the other part, which method requires no significant pressure, relatively low temperatures compared to the melting point of aluminum, and which yields a joint that can safely withstand high temperatures, e.g. 400° C.

In carrying out my invention in one form, I provide the following method of bonding an aluminum part to another part of a dissimilar metal. First, I provide an insert of a metal that is substantial immiscible with aluminum at temperatures up to 615° C. A surface of the insert is plated with a material selected from the group consisting essentially of copper and silver to provide a plated coating on the surface several tenths of a mil in thickness. The insert is then joined to the part of dissimilar metal in such a position that the plated coating is exposed. The aluminum part is positioned in contact with the plated coating. Then the surrounding temperature is raised to about 615° C., to cause diffusion of the metal of said plated coating into said aluminum, thereby effecting a bond between said insert and said aluminum part upon subsequent cooling.

For a better understanding of the invention, reference may be had to the following description taken in conjunction with the accompanying drawing, wherein:

FIGURE 1 is a schematic perspective view showing the parts used in practicing one form of the present invention.

FIG. 2 shows the parts at an intermediate stage in the practice of my method.

Referring now to FIG. 1, there is shown an aluminum part 10 that it is desired to join to a part 12, which, in a preferred form of the invention, is of copper or copper base alloys which are composed primarily of copper. I make this joint by first providing an insert 14 of a metal that is substantially immiscible with aluminum. In a preferred form of the invention this insert is of nickel. Stainless steel is also suitable.

The insert 14 is plated, preferably electroplated, with a metal 16, such as silver or copper, that adheres tenaciously to the metal of the insert. This electroplated coating is preferably made about 0.3 or 0.4 mil in thickness.

The surface 18 of the insert is preferably left unplated and is joined to the copper part 12 by a conventional brazing process. Preferably, this brazing operation is performed with a conventional silver-copper base alloy that is suitable for effecting a brazed joint between copper and nickel parts. An example of such a brazing alloy is a copper-silver eutectic. FIG. 2 depicts the parts after this brazing operation.

Prior to being joined to the nickel insert, the surfaces of the aluminum part are cleaned, preferably by a suitable etching process which substantially removes the usual oxide layer. After such etching, the surfaces of the aluminum part are suitably protected from exposure to oxygen or air, as by storage in dry nitrogen.

The aluminum part 10 is bonded to the insert 14, 16 in a vacuum. More specifically, the parts are placed in a vacuum; the aluminum part 10 is placed on the insert 14, 16 with its clean lower surface contacting the plated coating; and the temperature of the assembly is raised to about 615° C. At this elevated temperature, the metal of coating 16 diffuses into the aluminum, and upon subsequent cooling a strong bond is formed between the insert 14 and the aluminum part.

Tensile tests made with joints such as described hereinabove have demonstrated an unexpectedly high tensile strength. For example, joints made with a nickel insert 1/16 inch in thickness plated with either copper or silver 0.3 or 0.4 mil in thickness have demonstrated tensile strengths so high that the aluminum part failed while the joint remained intact. Similar results were obtained with a joint comprising a stainless steel insert plated with silver. A joint using an insert of stainless steel plated with copper had a lower, but still acceptable, tensile strength of about 6000 p.s.i.

A particular advantage of my method is that this high strength joint is obtained without the necessity for relying upon any significant pressures for holding the parts together during the bonding operation. The aluminum part is merely placed on the insert 14, 16 during the bonding operation, and no external pressure is applied. Eliminating the need for using such pressure is desirable because it eliminates the risk of deforming the aluminum part with these pressures, even when the aluminum softens at the elevated temperatures used for bonding.

Another advantage of my method is that I am able to use temperatures that are relatively low compared to the melting point of aluminum. As pointed out hereinabove, I use a temperature of about 615° C. which is well below the 660° C. melting point of aluminum. Brazing alloys of aluminum-silicon have been proposed for effecting heat resistant joints between aluminum and other parts, but this alloy requires a brazing temperature of 640° C. Using such temperatures presents an undue risk of melting or otherwise deforming the aluminum part.

In one device utilizing my invention, the aluminum part is the contact of a vacuum-type electric circuit interrupter, and the copper part is the supporting rod for the contact. It is required that the parts of such an interrupter have very clean surfaces, and this cleanliness is customarily obtained by a high temperature bakeout of the interrupter. A typical temperature for this bakeout is 400° C. or even slightly higher.

It is essential that the joint between the aluminum contact and the copper rod not be impaired or damaged by this high temperature bakeout. This high temperature-withstand requirement makes it infeasible to use the brazing alloys customarily used for aluminum, e.g., tin or zinc base alloys. Joints using these alloys melt, deform, or excessively vaporize at the bakeout temperature, and for one or more of these reasons, are generally not satisfactory. But joints made using my above-described technique have demonstrated that they can meet this high temperature bakeout requirement with an ample margin. No melting, deformation, or undue vaporization occurs since all the metals present have melting points considerably higher than 400° C. and relatively low vapor pressures at 400° C.

Another advantage of my process is that it requires no fluxes for conditioning the surfaces or otherwise aiding the bonding operation. The presence of such fluxes cannot be tolerated in a vacuum-type interrupter, for reasons of cleanliness, and it is therefore significant that I use no fluxes in my bonding process.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A method of bonding an aluminum part to a copper or copper base alloy, comprising the steps of:
    (a) providing an insert of a metal selected from the group consisting of nickel and stainless steel that is substantially immiscible with aluminum at temperatures up to 615° C.,
    (b) plating a surface of said insert with a material consisting essentially of a metal selected from the group consisting of copper and silver to provide a plated coating on said surface,
    (c) joining said insert to said copper or copper base alloy part in such a position that said plated coating is exposed,
    (d) positioning said aluminum part in contact with said plated coating in a non-oxidizing environment,
    (e) raising the surrounding temperature to about 615° C. to cause diffusion of the metal of said plated coating into said aluminum, whereby a bond is effected between said insert and said aluminum part upon subsequent cooling.
2. The method of claim 1 in which said coating is copper.
3. The method of claim 1 in which said coating is silver.
4. The method of claim 1 in which said insert is of nickel.
5. The method of claim 1 in which said insert is of stainless steel.
6. The method of claim 1 in which the plating operation produces a plated coating several tenths of a mil in thickness.
7. The method of claim 1 in which said aluminum part is maintained free of pressure high enough to produce deformation thereof during the period when the bond is being formed between said aluminum part and said insert.

References Cited
UNITED STATES PATENTS

| | | | |
|---|---|---|---|
| 3,055,098 | 9/1962 | Bratkowski | 29—492 |
| 3,083,452 | 4/1963 | Terrill | 29—487 |
| 3,105,293 | 10/1963 | Skinner | 29—474.4 |
| 3,107,422 | 10/1963 | Eckermann | 29—492 |
| 3,119,632 | 1/1964 | Skinner | 29—504 X |
| 3,180,022 | 4/1965 | Briggs | 29—504 X |
| 3,337,947 | 8/1967 | Terrill | 29—498 X |

JOHN F. CAMPBELL, *Primary Examiner.*

R. F. DROPKIN, *Assistant Examiner.*